US011153452B2

(12) United States Patent
Kurimoto et al.

(10) Patent No.: US 11,153,452 B2
(45) Date of Patent: Oct. 19, 2021

(54) DOCUMENT FEEDING DEVICE AND IMAGE FORMING APPARATUS

(71) Applicant: SHARP KABUSHIKI KAISHA, Sakai (JP)

(72) Inventors: Hideaki Kurimoto, Sakai (JP); Tohru Nishikawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/921,766

(22) Filed: Jul. 6, 2020

(65) Prior Publication Data

US 2021/0021725 A1   Jan. 21, 2021

(30) Foreign Application Priority Data

Jul. 19, 2019 (JP) .............................. JP2019-133650

(51) Int. Cl.
*H04N 1/00* (2006.01)

(52) U.S. Cl.
CPC ..... *H04N 1/00543* (2013.01); *H04N 1/00602* (2013.01); *H04N 1/00604* (2013.01); *H04N 1/00615* (2013.01)

(58) Field of Classification Search
CPC ........... H04N 1/00543; H04N 1/00615; H04N 1/00604; H04N 1/00602; H04N 1/00352; H04N 1/00384; H04N 1/00397; H04N 1/00411; H04N 1/00416; H04N 1/00437; H04N 1/00496; H04N 1/58; H04N 1/60; G03G 15/6544; G03G 2215/00818; G03G 2215/00827; G03G 2215/00831; G03G 15/5012; G03G 15/502; G03G 15/602; G03G 2215/00548; G03G 2215/00814; G06K 15/16; G06K 15/4085
USPC ........................................ 358/498, 497, 496
See application file for complete search history.

(56) References Cited

U.S. PATENT DOCUMENTS

| 2002/0041775 A1* | 4/2002 | Ishii ................... H01H 11/0018 |
| | | 399/124 |
| 2007/0139813 A1* | 6/2007 | Min ....................... G11B 33/12 |
| | | 360/96.61 |
| 2009/0122330 A1* | 5/2009 | Andoh ............... H04N 1/00525 |
| | | 358/1.13 |
| 2015/0084277 A1* | 3/2015 | Maruyama ............... B65H 1/04 |
| | | 271/272 |
| 2015/0085049 A1* | 3/2015 | Iijima ................ H04N 1/00533 |
| | | 347/110 |

(Continued)

FOREIGN PATENT DOCUMENTS

| JP | H11-106086 A | 4/1999 |
| JP | 2006-036410 A | 2/2006 |

*Primary Examiner* — Negussie Worku
(74) *Attorney, Agent, or Firm* — ScienBiziP, P.C.

(57) ABSTRACT

A document feeding device 10 of an image forming apparatus 1 includes a housing 14 that houses a document conveyance mechanism 15, and a document set tray 16. An upper cover 12 of the housing 14 is openable and closable with respect to a fixed cover 11, and the document set tray 16 is swingably supported. A closed position of the upper cover 12 with respect to the fixed cover 11 is set to a position overlapping with a movement trajectory M of the document set tray 16 during a swinging operation, and it is possible to open the upper cover 12 in connection with the swinging operation of the document set tray 16.

7 Claims, 7 Drawing Sheets

(56) References Cited

U.S. PATENT DOCUMENTS

| | | | |
|---|---|---|---|
| 2015/0115519 A1* | 4/2015 | Takezawa | B65H 3/0669 271/117 |
| 2015/0172491 A1* | 6/2015 | Lee | B65H 5/06 358/498 |
| 2015/0321870 A1* | 11/2015 | Okamoto | B65H 31/3027 358/1.12 |
| 2016/0363899 A1* | 12/2016 | Sato | G03G 15/6552 |
| 2017/0297843 A1* | 10/2017 | Kakuta | B65H 5/36 |
| 2019/0078759 A1* | 3/2019 | Yamasaki | G02B 6/0031 |
| 2019/0082072 A1* | 3/2019 | Yamasaki | H04N 1/02855 |

* cited by examiner

DOCUMENT FEEDING DEVICE AND IMAGE FORMING APPARATUS

BACKGROUND OF THE INVENTION

Field of the Invention

The present invention relates to a document feeding device and an image forming apparatus including the document feeding device.

Description of the Background Art

As a multifunctional apparatus with a printer function, a scanner function, and the like, there is known a multifunctional apparatus including a document feeding device for automatically feeding a document. For example, a multifunctional apparatus disclosed in Japanese Unexamined Patent Application Publication No. 2006-036410 (hereinafter, referred to as Patent Document 1) includes an auto document feeder (ADF) on an upper part of an apparatus main body. In this type of auto document feeder, a document conveyance mechanism sequentially conveys a bundle of documents set on a document tray along a predetermined conveyance path and discharges the documents to a document discharge tray. The multifunctional apparatus is configured such that images of the documents are read while the documents are being conveyed along the conveyance path by the auto document feeder.

In the auto document feeder in Patent Document 1, an upper frame is openably attached to a main body frame. If a document jam occurs due to a document getting stuck during a document reading operation, the upper frame can be opened, and further, an intermediate frame between the main body frame and the upper frame can be opened to perform an operation for resolving the document jam.

Japanese Unexamined Patent Application Publication No. 11-106086 also discloses an auto document feeder in which an upper frame and an intermediate frame are openably provided with respect to a main body frame, and the upper frame and the intermediate frame may be opened to perform an operation for resolving a document jam.

In the conventional auto document feeders described above, the upper frame is often firmly fixed to the main body frame to maintain a precise conveyance path. Therefore, during the operation for resolving the document jam, it is difficult to hold and open the upper frame. In particular, people having less strength such as women or older people experience difficulties in opening the upper frame, and thus, the auto document feeders are difficult to be handled.

The present invention has been made in view of the above problems, and an object thereof is to provide a document feeding device and an image forming apparatus including the document feeding device, in which a document conveyance mechanism in the document feeding device is easily exposed, and the workability of an operation for resolving a sheet jam and of a maintenance work is improved.

SUMMARY OF THE INVENTION

To solve the object described above, a solving means according to the present invention is a document feeding device including a housing that houses a document conveyance mechanism, and a document set tray on which a document is placed. The housing includes a first housing and a second housing that is openable and closable with respect to the first housing, the document set tray includes an engagement that engages with the first housing and is swingably supported with respect to the first housing with the engagement as a fulcrum, and a closed position of the second housing with respect to the first housing is set to a position overlapping with a movement trajectory of the document set tray during a swinging operation, and thus, the second housing is openable in connection with the swinging operation of the document set tray.

With this specific matter, it is possible to open the second housing by swinging the document set tray when the document conveyance mechanism housed in the housing is exposed, and thus, it is easier to open the second housing than in a case where the second housing is directly held and opened by a hand. Thus, any user can easily open the second housing to improve the workability of an operation for resolving a sheet jam and of a maintenance work.

A more specific configuration of the document feeding device will be described below. That is, in the document feeding device, it is preferable that the second housing includes a first shaft pivotally supported by the first housing and pivots about the first shaft, and the second housing is further openable from a first open position where the second housing pivots in conjunction with the swinging operation of the document set tray, to a second open position, where the second housing makes the document conveyance mechanism exposed. Thus, if the document set tray is lifted, the second housing can easily pivot about the first shaft and be opened.

Further, the document feeding device may be configured so that the document set tray includes a second shaft pivotally supported by the first housing in the engagement and pivots about the second shaft, and the document set tray includes an inclined surface having an upward slope from one end near the engagement toward another end at a side opposite to the engagement. As a result, if the document set tray is lifted, the document set tray can be pivoted about the second shaft, and thus, the second housing can be easily opened with the second shaft as a fulcrum.

Further, an image forming apparatus including the document feeding device is also included in a scope of the technical idea of the present invention. Thus, the second housing can be easily opened during an operation for resolving a sheet jam and a maintenance work in the image forming apparatus, and the workability can be improved.

According to the present invention, it is possible to open the second housing with respect to the first housing by swinging the document set tray, and thus, it is extremely easy to expose the document conveyance mechanism. Therefore, it is possible to improve the workability of an operation for resolving a sheet jam and of a maintenance work.

DESCRIPTION OF THE PREFERRED EMBODIMENTS

A document feeding device and an image forming apparatus according to an embodiment of the present invention will be described below with reference to the drawings.

Figure 1:
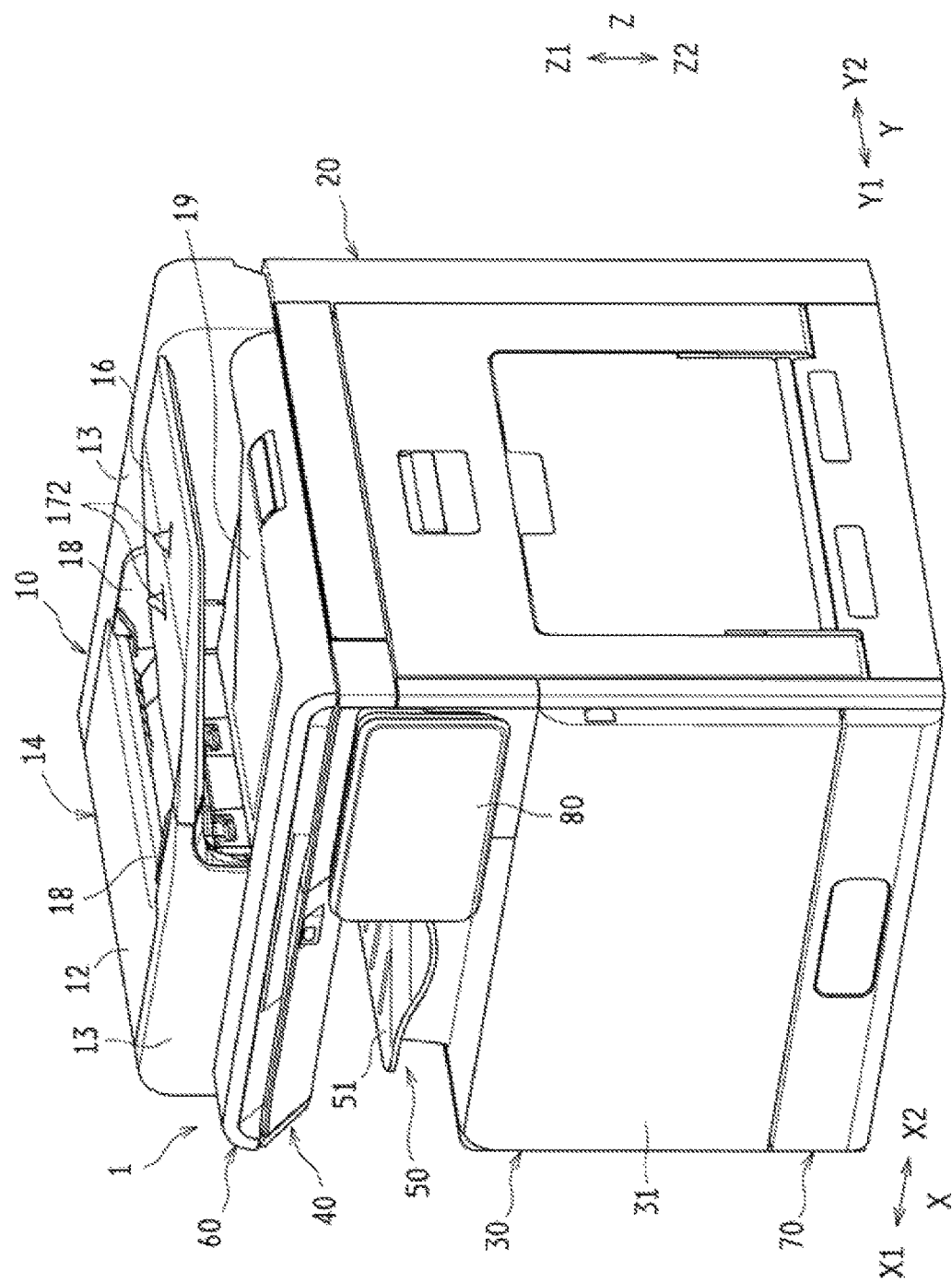
FIG. 1 is a perspective view illustrating an image forming apparatus including a document feeding device according to an embodiment of the present invention.

FIG. 1 is a perspective view illustrating an image forming apparatus 1 according to the embodiment of the present invention.

The image forming apparatus 1 is an in-body discharge type image forming apparatus including an in-body discharge space 50 between an image former 30 and an image reader 40 of an apparatus main body 20. The image forming apparatus 1 forms a polychrome or monochrome image on a predetermined sheet (recording medium), based on image data, and the like read by the image reader 40, and discharges the sheet on which the image is formed, to the in-body discharge space 50. The image forming apparatus 1 according to the embodiment is a multifunction peripheral (MFP) having a copying function, a printer function, a scanner function, a facsimile function, and the like.

In the following description, a surface of the apparatus main body 20 facing a user using the image forming apparatus 1, that is, a surface on a side where an operation panel 80 described later is provided is defined as a front surface (front face) of the apparatus main body 20, and a front-rear direction (depth direction) Y of the image forming apparatus 1 and constituent members thereof is defined as illustrated in FIG. 1 and the like. Further, a left-right direction X and a height direction Z of the image forming apparatus 1 are defined based on a state where the image forming apparatus 1 is viewed from the user, and the description will be provided.

First, a basic configuration of the image forming apparatus 1 will be described. As illustrated in FIG. 1, the image forming apparatus 1 includes, in the apparatus main body 20, the image former 30 and the image reader 40 arranged in an area Z1 above the image former 30. The in-body discharge space 50 to which a sheet on which an image is formed is discharged is provided between the image former 30 and the image reader 40.

The image former 30 includes an exposer, a developing device, a photosensitive drum, a charger, an intermediate transfer belt, a transfer roller, a fixer, and the like. The image former 30 forms an image on a sheet conveyed from a sheet feeder 70 or the like arranged in an area Z2 below the image former 30, by an electrophotographic method. These constituent members of the image former 30 are covered by an opening/closing cover 31 provided on the front surface.

The image former 30 forms an electrostatic latent image based on image data on the photosensitive drum by the charger, the exposer, and the like, and visualizes the electrostatic latent image on the photosensitive drum with toner by the developing device. The image data includes image data read by the image reader 40, image data transmitted from an external computer, or the like. A toner image formed on the photosensitive drum is transferred onto a sheet by an intermediate transfer belt, a transfer roller, and the like, and the toner image transferred onto the sheet is thermally fixed by the fixer. The sheet on which the image is formed is discharged from a discharge port to the in-body discharge space 50.

In an exemplified embodiment, the in-body discharge space 50 is a space being recessed toward a rear side Y2 of the opening/closing cover 31 and opening toward a side (here, a left side X1). A sheet discharge tray 51 is provided in the in-body discharge space 50, and a sheet on which an image is formed is discharged to the sheet discharge tray 51.

The operation panel 80 is provided on the front surface of the apparatus main body 20. The operation panel 80 is provided on a side (a right side X2) of the in-body discharge space 50, and is arranged with a front surface of the operation panel 80 facing a front Y1. The operation panel 80 includes a display and a plurality of operation keys such as a start key. Further, the operation panel 80 notifies of data reception such as fax reception, an occurrence of an error, and the like, and displays a corrective method on the display.

The image reader 40 includes a document platen, a light source, a plurality of mirrors, an imaging lens, a line sensor, and the like. The image reader 40 exposes a document surface with light from the light source, and guides reflected light reflected from the document surface to the imaging lens by the plurality of mirrors, to form an image on a light receiving element of the line sensor. The line sensor detects luminance and chromaticity of the reflected light imaged on the light receiving element to generate image data based on an image on the document surface. A CCD, CIS, or the like is employed for the line sensor.

In the image forming apparatus 1, a controller that controls an operation of each of the above constituent components is provided in the apparatus main body 20. The controller includes a CPU, a memory, and the like, and transmits a control signal to each of the above constituent components to execute various operations in accordance with an operation by a user or the like.

A document feeding device 10 and a document holder 60 are provided in an area Z1 above the image reader 40. The document holder 60 is provided openably with respect to the apparatus main body 20. For example, the document holder 60 is pivotably supported by an opening/closing shaft at the rear side (back side) Y2 of the apparatus main body 20, and a document holding member 61 provided inside the document holder 60 can be opened and closed.

Figure 2:
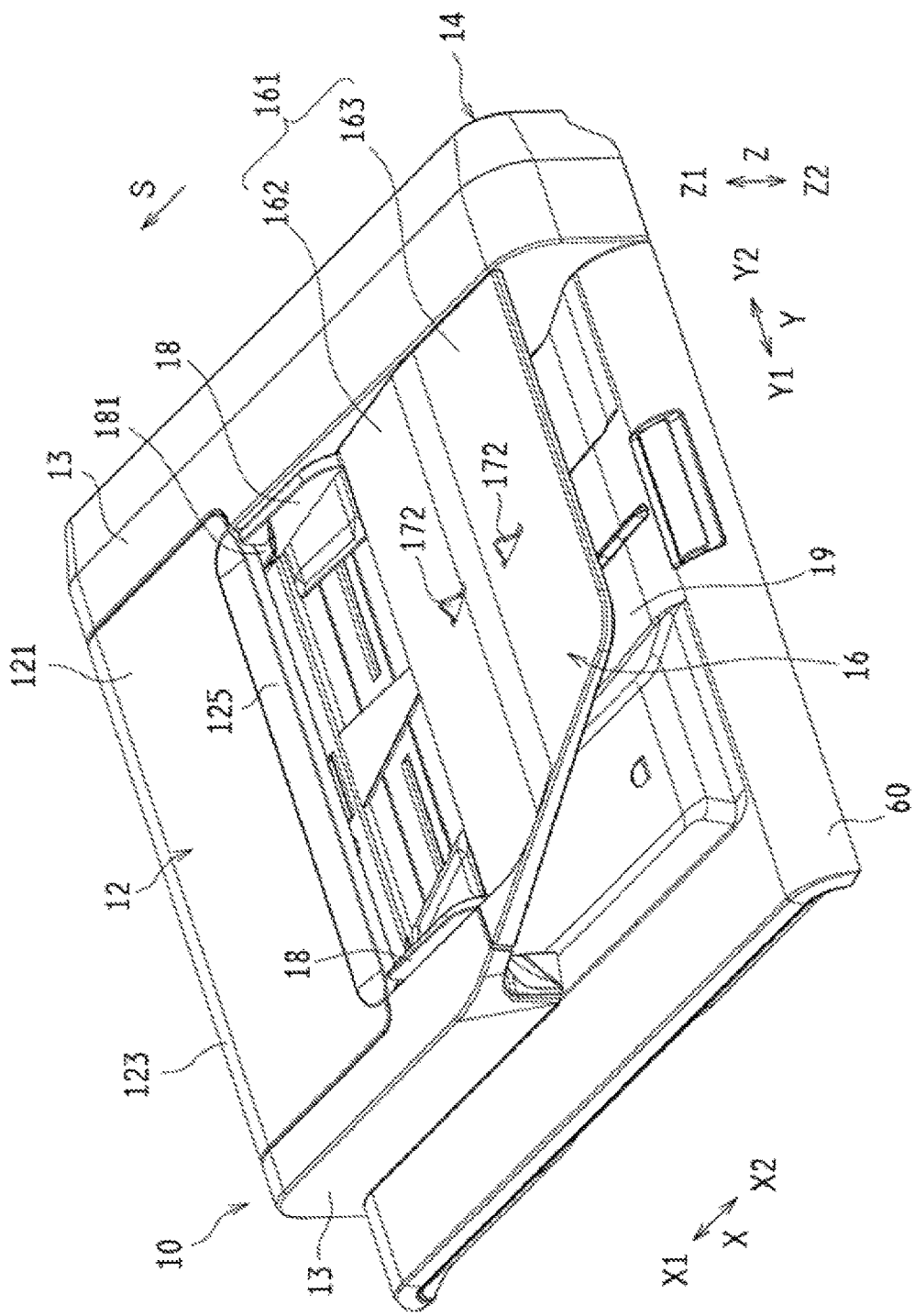
FIG. 2 is a perspective view illustrating the document feeding device according to the embodiment of the present invention.
Figure 3:
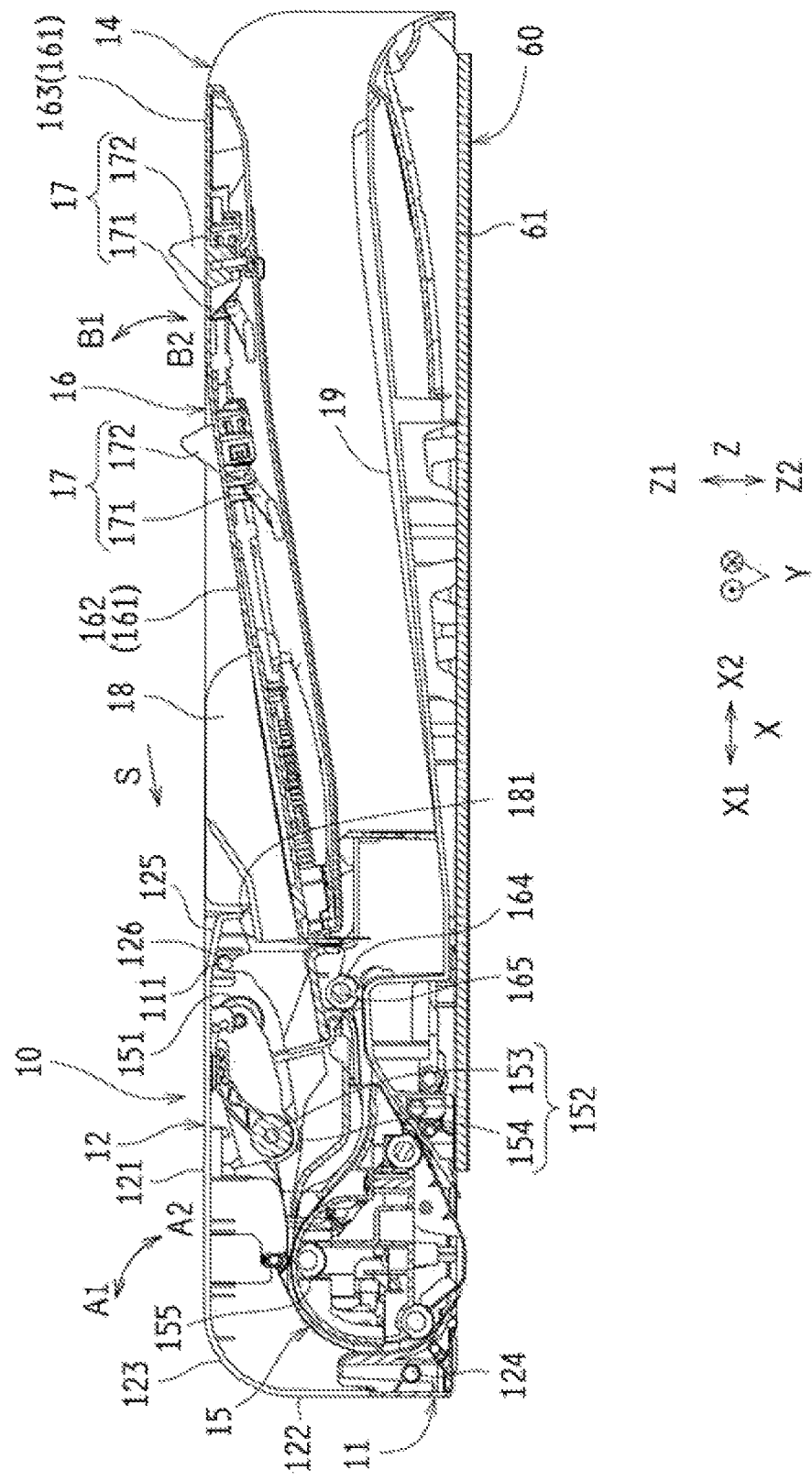
FIG. 3 is a cross-sectional view illustrating an internal structure of the document feeding device.

Next, the document feeding device 10 of the image forming apparatus 1 will be described. FIG. 2 is a perspective view illustrating the document feeding device 10 according to the embodiment of the present invention. FIG. 3 is a cross-sectional view illustrating an internal structure of the document feeding device 10 illustrated in FIG. 2.

The document feeding device 10 according to the exemplified embodiment is an automatic document feeding device for automatically conveying documents one by one to an image reading position of the image reader 40. The document feeding device 10 includes a housing 14, a document conveyance mechanism 15 housed in the housing 14, a document set tray 16, and a document discharge tray 19 arranged in an area Z2 below the document set tray 16.

As illustrated in FIG. 3, the document conveyance mechanism 15 includes an intake roller (pickup roller) 151, a separation conveyor 152, a document conveyance roller 155, and the like. Documents set on the document set tray 16 are sequentially conveyed by the document conveyance mechanism 15 along a predetermined conveyance path, and discharged to the document discharge tray 19.

The intake roller 151 takes in a topmost document among the documents set on the document set tray 16 into the document conveyance mechanism 15. The separation conveyor 152 separates and conveys one by one the documents taken in by the intake roller 151. The separation conveyor 152 includes a sheet feed roller 153 and a separation pad 154. The sheet feed roller 153 conveys the documents taken in by the intake roller 151, one by one toward the document conveyance roller 155, in cooperation with the separation pad 154. The document conveyance roller 155 conveys the document in accordance with an operation timing of the members on a downstream side in a document conveyance direction S (an image reading timing of the image reader 40). The intake roller 151, the separation conveyor 152, and the document conveyance roller 155 are rotationally driven by a drive device (not illustrated) provided in the housing 14.

The document set tray 16 includes a document set surface 161, houses a document detection sensor 17 in the document set tray 16, and a guide member 18 on the document set surface 161. The document detection sensor 17 includes a movable detector 171, and a protrusion 172 of the movable detector 171 protrudes from the document set surface 161 of the document set tray 16. In the exemplified embodiment, two of the document detection sensors 17 are provided. However, the number of the installed document detection sensors 17 is not particularly limited as long as the number is suitable for detecting a document.

The document set surface 161 is a surface for setting a document. The document set surface 161 is provided to be inclined in the left-right direction X, as illustrated in FIG. 2. In this case, the document set surface 161 includes an inclined surface 162 having an upward slope from the left side X1 toward the right side X2. A flat surface 163 having no slope is provided further outside (on the right side X2) of the inclined surface 162. The inclined surface 162 and the flat surface 163 may be continuously provided. For example, any one or both of the inclined surface 162 and the flat surface 163 may be a transparent or translucent member so that the document discharge tray 19 is easily viewed.

The guide member 18 is provided on the document set surface 161 on the downstream side in the document conveyance direction S (left side X1 in the left-right direction X). Two of the guide members 18 are arranged to face each other in a width direction (here, the front-rear direction Y) orthogonal or substantially orthogonal to the document conveyance direction S. The guide members 18 guide a side surface of a document to be conveyed, and are used by adjusting an interval between the guide members 18 to a width of the document. If one of the two guide members 18 moves, the other of the two guide member 18 also moves symmetrically in accordance with the one guide member 18. The document can be stably fed by moving the two guide members 18 in accordance with the document size.

Further, the document set surface 161 is formed so that the width of the document set surface 161 in the front-rear direction Y becomes gradually narrower from the downstream side toward the upstream side in the document conveyance direction S. As illustrated in FIG. 2, in the exemplified embodiment, the width of the flat surface 163 provided outside the inclined surface 162 is narrower than the width of the inclined surface 162 of the document set surface 161. The document set tray 16 is formed with a width narrower toward the outside of the document set surface 161, and thus, it is easy to hold an end of the document set tray 16 by a hand.

In the document set tray 16, two of the protrusions 172 protrude substantially at a center of the document set surface 161 in the front-rear direction Y. The document detection sensors 17 including the protrusions 172 are provided with a photo sensor, a weight, and the like inside the document set tray 16, and are so-called contact-type detection sensors that pivot about a pivot fulcrum, for example. As illustrated in FIG. 3, if the movable detector 171 provided inside the document set tray 16 pivots about the pivot fulcrum, the protrusions 172 are pushed to the inside of the document set surface 161, or protrude upward from the document set surface 161.

For example, as illustrated in FIG. 2, the protrusions 172 project from the document set surface 161 if no document is set on the document set surface 161. At this time, the photo sensor inside the document set tray 16 is blocked, and it is detected that "no document is present". If a document is set on the document set surface 161, the protrusions 172 are pushed by the document to enter a space below the document set surface 161, and thus, the photosensor is not blocked, and it is detected that "a document is present".

The document conveyance mechanism 15 and the document set tray 16 are held in the housing 14 of the document feeding device 10. The housing 14 includes a fixed cover 11 serving as a first housing, an upper cover 12 serving as a second housing openably provided with respect to the fixed cover 11, and an exterior cover 13 that covers front and rear side surfaces of the fixed cover 11 and the upper cover 12.

As illustrated in FIG. 3, the fixed cover 11 is provided in an area Z1 above the document holder 60 and houses the document conveyance mechanism 15 therein. The upper cover 12 is provided to cover an area Z1 above the fixed cover 11 and the document conveyance mechanism 15, and is arranged on the downstream side of the document set tray 16 in the document conveyance direction S.

In the exemplified embodiment, the upper cover 12 is arranged on one side (here, on the left side X1) of the document feeding device 10 in the left-right direction X, and includes an upper surface 121, a side surface 122, and a curved surface 123 that smoothly connects the upper surface 121 and the side surface 122. The upper cover 12 includes a first shaft 124 pivotally supported by the fixed cover 11 at a lower end of the side surface 122.

The upper cover 12 is pivotably supported by the fixed cover 11 via the first shaft 124. The upper cover 12 pivots about the first shaft 124 in a direction of an arrow A1 or A2, and thus, opens and closes with respect to the fixed cover 11 provided to face the upper cover 12. The intake roller 151 of the document conveyance mechanism 15 is rotatably held by the upper cover 12, and is arranged above the document set surface 161 of the document set tray 16 and separated from the document set surface 161.

The document set tray 16 includes an engagement 164 that engages with a second shaft 165 pivotally supported by the fixed cover 11 at an end of the downstream side (here, the left side X1 in the left-right direction X) in the document conveyance direction S. The document set tray 16 is swingably supported with respect to the fixed cover 11 with the engagement 164 as a fulcrum. The document set tray 16 pivots about the second shaft 165 in a direction of an arrow B1 or B2.

As described above, in the document set tray 16, the document set surface 161 includes the inclined surface 162 having an upward slope from one end near the second shaft 165 to the other end on a side opposite to the second shaft 165, and the flat surface 163 parallel to the document holding member 61.

The upper cover 12 is provided to remove a document if the document gets stuck in the above-described document conveyance mechanism 15 and a document jam occurs. If a front end 125 (see FIG. 2) of the upper cover 12 on the side of the document set tray 16 is held and lifted by a hand, the upper cover 12 pivots about the first shaft 124 in the direction of the arrow A1, and thus, the upper cover 12 can be opened. If the upper cover 12 is opened, the inside of the housing 14 is opened to expose the document conveyance mechanism 15, and thus, it is easy to perform an operation for resolving the document jam.

If the front end 125 of the upper cover 12 is held and pushed downward, the upper cover 12 pivots about the first shaft 124 in the direction of the arrow A2, and thus, the upper cover 12 can be closed as illustrated in FIG. 2. If the upper cover 12 is closed, the document conveyance mechanism 15 is covered by the upper cover 12 and the fixed cover 11 in cooperation. As illustrated in FIG. 3, if the upper cover 12 is closed, a locking recess 126 provided on an inner surface of the front end 125 is locked to a locking projection 111 of the fixed cover 11, and thus, the closed state is maintained.

Figure 6:
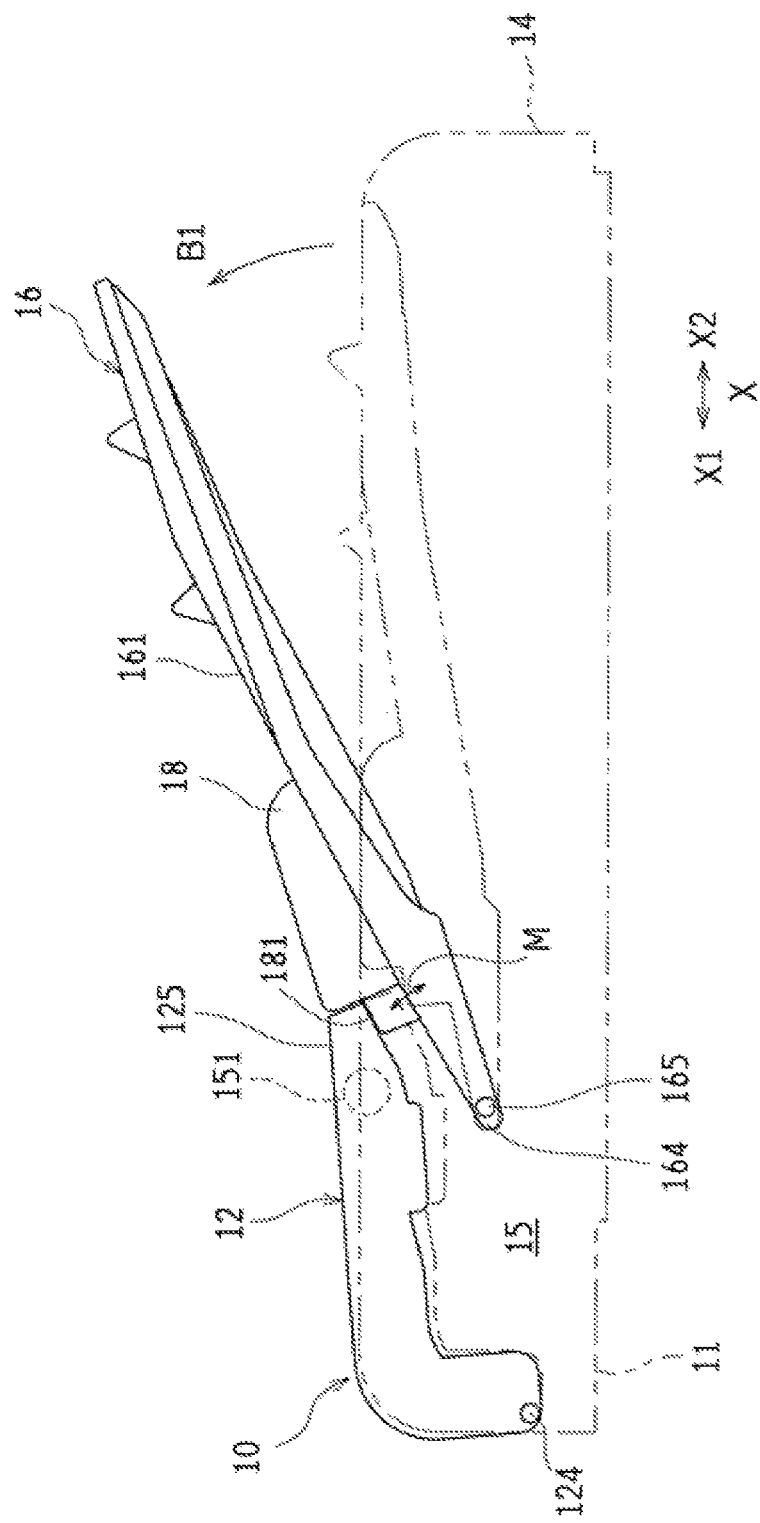
FIG. 6 is an explanatory diagram schematically illustrating a first open position of the upper cover if the document set tray is further pivoted from the state in FIG. 5.

Here, in the document feeding device 10 according to the present embodiment, a closed position of the upper cover 12 with respect to the fixed cover 11 is set to a position overlapping a movement trajectory M of the document set tray 16 during a swinging operation (see FIG. 6). Therefore, when the upper cover 12 is opened, it is possible to open the upper cover 12 with a lighter force by utilizing the swinging operation of the document set tray 16.

Figure 4:
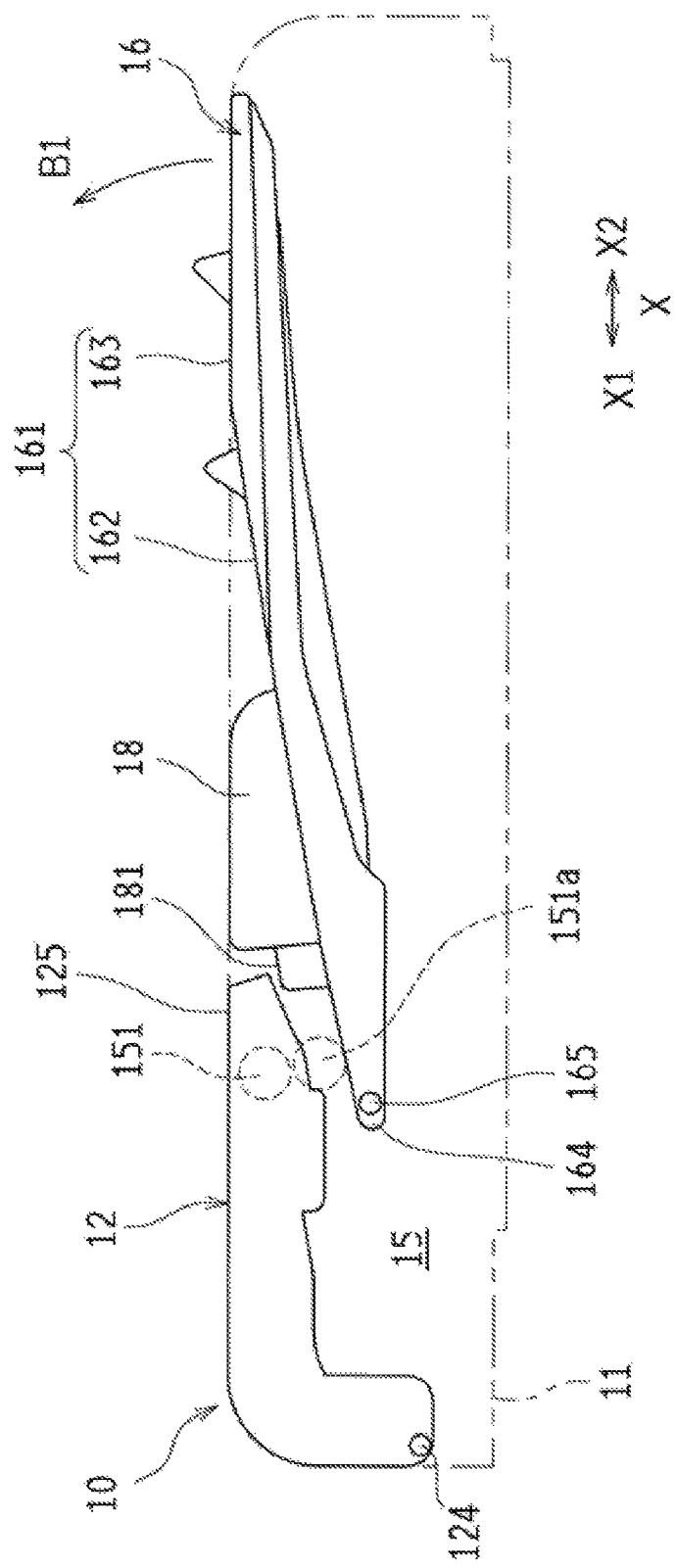
FIG. 4 is an explanatory diagram schematically illustrating an upper cover and a document set tray in the document feeding device.
Figure 5:
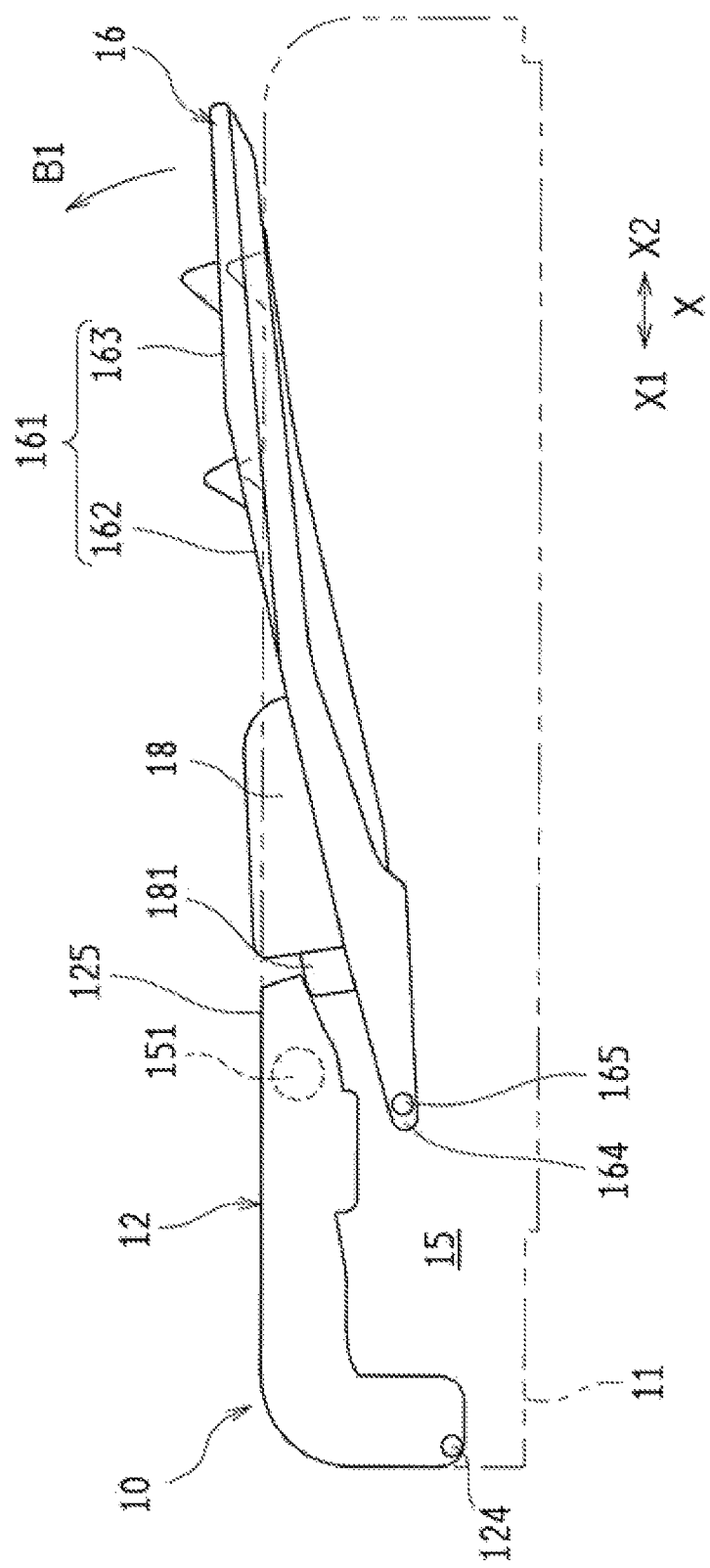
FIG. 5 is an explanatory diagram schematically illustrating a state where the document set tray is pivoted from the state in FIG. 4.
Figure 7:
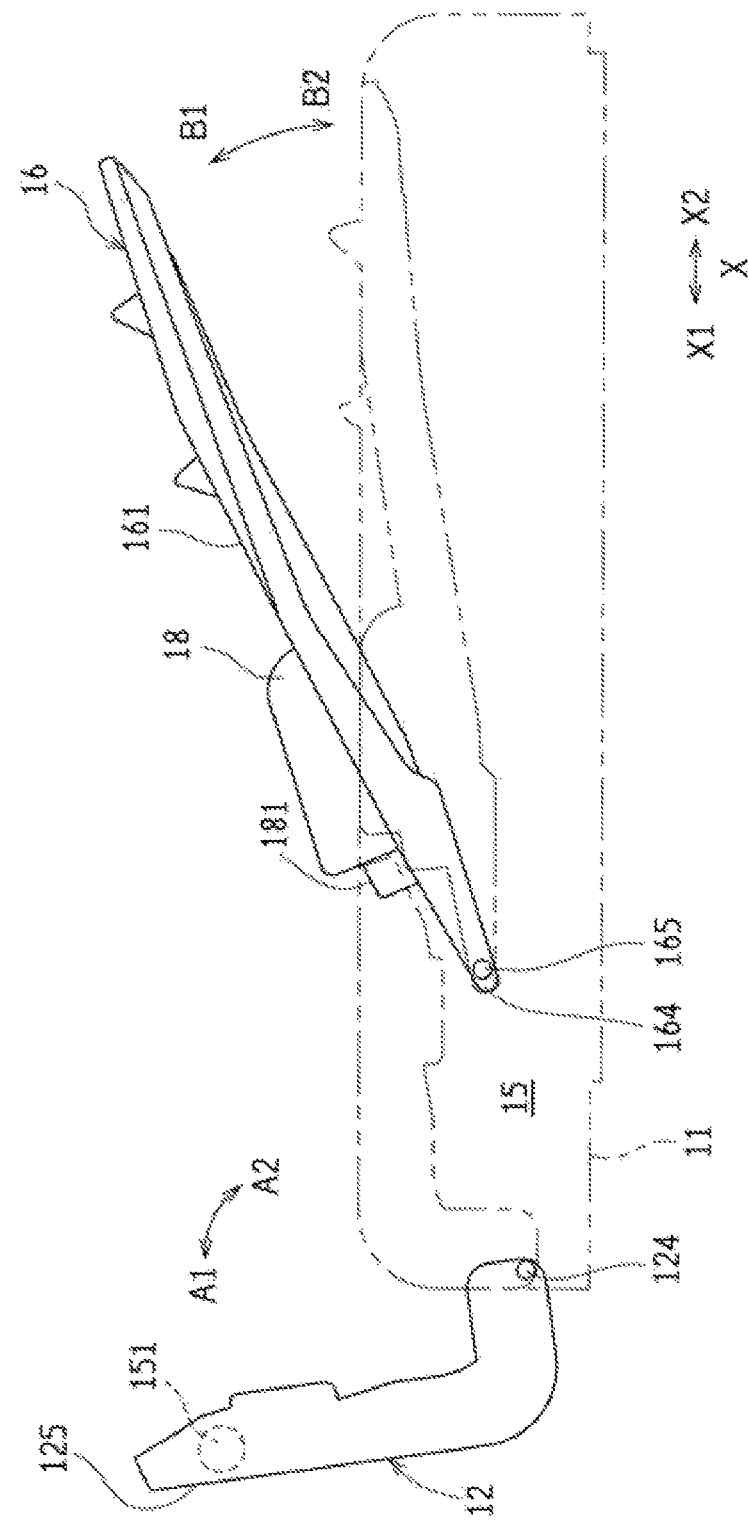
FIG. 7 is an explanatory diagram schematically illustrating a second open position in which the upper cover is pivoted from the state in FIG. 6.

FIG. 4 is an explanatory diagram schematically illustrating the upper cover 12 and the document set tray 16 in the document feeding device 10. FIGS. 5 to 7 are explanatory diagrams illustrating an opening operation of the upper cover 12 stepwise. FIG. 5 is an explanatory diagram illustrating a state where the document set tray 16 is pivoted from the state in FIG. 4. FIG. 6 is an explanatory diagram illustrating a first open position of the upper cover 12 if the document set tray 16 is further pivoted from the state in FIG. 5. FIG. 7 is an explanatory diagram illustrating a second open position in which the upper cover 12 is pivoted from the state in FIG. 6.

In FIG. 4, the document set tray 16 is pivotable about the second shaft 165, and for example, an end of the document set tray 16 at the right side X2 in the left-right direction X can be held by a hand and easily lifted in the direction of the arrow B1. If a document gets stuck in the document conveyance mechanism 15 and a document jam occurs, the upper cover 12 can be directly held and opened by a hand to expose the document conveyance mechanism 15 as described above. On the other hand, a user for whom an opening operation of the upper cover 12 is difficult can more easily open the upper cover 12 by lifting the document set tray 16.

In the document feeding device 10, if the document set tray 16 is caused to swing while the upper cover 12 is closed, the document set tray 16 interferes with the front end 125 of the upper cover 12. For example, as illustrated in FIG. 5, if the document set tray 16 is lifted in the direction of the arrow B1, the guide members 18 of the document set tray 16 abut against the front end 125 of the upper cover 12. The two guide members 18 provided on the document set surface 161 each include an abutment 181 that abuts against the upper cover 12 during the swinging operation of the document set tray 16, and the abutment 181 abuts against a lower surface of the front end 125 of the upper cover 12.

As illustrated in FIGS. 2 and 4, the abutment 181 of the guide member 18 is provided at a position in an area Z2 below the front end 125 of the upper cover 12, and includes a flat surface facing the upper cover 12. The closed position of the upper cover 12 with respect to the fixed cover 11 is set to a position overlapping the movement trajectory M of the document set tray 16 during the swinging operation (see FIG. 6). As a result, if the document set tray 16 is lifted, the abutment 181 of the guide member 18 is configured to abut against the upper cover 12.

As illustrated in FIG. 6, if the document set tray 16 is further lifted in the direction of the arrow B1, the upper cover 12 is pushed upward while abutting against the abutment 181 of the guide member 18, and thus, the closed state is released (first open position). Then, the upper cover 12 pivots about the first shaft 124 in the direction of the arrow A1.

The locking recess 126 of the upper cover 12 is disengaged from the locking projection 111 of the fixed cover 11. At this time, even though the front end 125 of the upper cover 12 is separated from the closed position, the document conveyance mechanism 15 inside the upper cover 12 remains covered.

The closed state of the upper cover 12 is released, and thus, the upper cover 12 is pivotable about the first shaft 124 with respect to the fixed cover 11. Therefore, from this state, it is possible to easily hold the front end 125 of the upper cover 12 by a hand and pivot the upper cover 12 with a light force in the direction of the arrow A1. As illustrated in FIG. 7, the upper cover 12 pivots about the first shaft 124 in the direction of the arrow A1, and as a result, the upper cover 12 is completely opened, and the document conveyance mechanism 15 inside the upper cover 12 is exposed (second open position). The intake roller 151 moves together with the upper cover 12 and separates from the document set tray 16.

Thus, the document set tray 16 can be utilized to open the upper cover 12, and thus, the document conveyance mechanism 15 can be easily exposed, and the workability of an operation for resolving a document jam and of a maintenance work can be improved.

The document set tray 16 includes the inclined surface 162 inclined upward toward the outside (here, the right side X2), and swings with the second shaft 165 located at the end at the side opposite to the right side X2 of the document set tray 16 as a pivot fulcrum. The document set tray 16 has a width narrower toward the outside and is configured to be easily held by the user. Thus, the principle of leverage acts in the document set tray 16, in which the outside of the document set tray 16 held by the user serves as a point of effort, the guide member 18 on the document set surface 161 serves as a point of load, and the second shaft 165 serves as a fulcrum. Therefore, if the document set tray 16 is utilized to open the upper cover 12, it is possible to open the upper cover 12 with a lighter force than a case in which the upper cover 12 is directly held and opened by a hand.

The document set tray 16 has a length in the left-right direction X and a sufficient length outward the guide member 18, which is advantageous for opening the upper cover 12. Further, two of the guide members 18 are provided on the document set surface 161, and thus, the abutments 181 of these guide members 18 evenly transmit the force to the upper cover 12 to push the upper cover 12 upward in a well-balanced manner. It is preferable that at least two of the guide members 18 are arranged in parallel, and three or more of the guide members 18 may be provided.

The document set tray 16 includes the document detection sensor 17 therein and has a thickness for the user to easily hold the document set tray 16 by a hand. The document set tray 1 maintains sufficient strength to be lift by a hand. If a document gets stuck during a document reading operation and a document jam occurs, even a user having little strength can easily open the upper cover 12, and the workability of an operation for resolving the document jam is improved. Further, even during a normal maintenance, the upper cover 12 can be easily opened, and thus, the workability of the maintenance can be significantly improved.

In the document feeding device 10, the intake roller 151 is rotatably held by the upper cover 12 and is arranged above the document set surface 161 of the document set tray 16, and thus, it is advantageous that the intake roller 151 is not always in contact with the document set surface 161 to suppress a damage. Further, as illustrated in FIG. 4, there may be provided an intake roller 151a rotatably held by the upper cover 12 and arranged to contact the document set tray 16, instead of the intake roller 151. In this case, advantageously, if the upper cover 12 is opened and closed, the intake roller 151a acts as a buffer member between the upper cover 12 and the document set tray 16.

With the document feeding device 10 and the image forming apparatus 1 configured as described above, the upper cover 12 can be configured to be more easily opened than that known in the art, and thus, the document conveyance mechanism 15 inside the upper cover 12 is easily exposed. As a result, it is possible to improve the workability of an operation for resolving a jam and of a maintenance work.

In the document feeding device 10 according to the above-described embodiment, the housing 14 in which the upper cover 12 and the fixed cover 11 are combined is illustrated as an example, however, it is not necessary that one of the covers is a fixed cover, and the housing 14 may include a combination of covers where both the covers are opened and closed or are displaced.

Further, the configurations of the image forming apparatus and the document feeding device illustrated in the above-described embodiment are merely examples, and can be appropriately changed according to actual product specifications and the like. The technical scope of the present invention should not be construed only by the above-described embodiment, but should be based on the claims. Further, the technical scope of the present invention includes all modifications within the meaning and scope equivalent to the scope of the claims.

DESCRIPTION OF REFERENCE NUMERALS

1 Image forming apparatus
10 Document feeding device
11 Fixed cover (First housing)
111 Locking projection
12 Upper cover (Second housing)
121 Upper surface
122 Side surface
123 Curved surface
124 First shaft
125 Front end
126 Locking recess
13 Exterior cover
14 Housing
15 Document conveyance mechanism
151 Intake roller
152 Separation conveyor
153 Sheet feed roller
154 Separation pad
155 Document conveyance roller
16 Document set tray
161 Document set surface
162 Inclined surface
163 Flat surface
164 Engagement
165 Second shaft
17 Document detection sensor
171 Movable detector
172 Protrusion
18 Guide member
181 abutment
19 Document discharge tray
20 Apparatus main body
30 Image former
40 Image reader
50 In-body discharge space
60 Document holder
61 Document holding member
M Movement trajectory
S Document conveyance direction
X Left-right direction
Y Front-rear direction
Z Height direction

What is claimed is:

1. A document feeding device comprising:
a housing that houses a document conveyance mechanism; and
a document set tray on which a document is placed, wherein
the housing includes a first housing and a second housing that is openable and closable with respect to the first housing,
the document set tray includes an engagement that engages with the first housing, and is swingably supported with respect to the first housing with the engagement as a fulcrum, and
a closed position of the second housing with respect to the first housing is set to a position overlapping with a movement trajectory of the document set tray during a swinging operation, by lifting the document set tray above with the engagement as a fulcrum, the document set tray abuts against the second housing and the second housing is pushed upward while abutting against the document set tray, and the second housing is openable.

2. The document feeding device according to claim 1, wherein
the second housing includes a first shaft pivotally supported by the first housing and pivots about the first shaft, and
the second housing is further openable from a first open position, where the second housing pivots in conjunction with the swinging operation of the document set tray, to a second open position, where the second housing makes the document conveyance mechanism exposed.

3. The document feeding device according to claim 2, wherein
the document set tray includes a second shaft pivotally supported by the first housing in the engagement and pivots about the second shaft, and
the document set tray includes an inclined surface having an upward slope from one end near the engagement toward another end at a side opposite to the engagement.

4. The document feeding device according to claim 1, wherein
   the document set tray includes at least two guide members arranged in parallel in a width direction of the document that is orthogonal or substantially orthogonal to a conveyance direction of the document, and
   the at least two guide members include an abutment that abuts against the second housing during the swinging operation of the document set tray.

5. The document feeding device according to claim 1, wherein
   the document conveyance mechanism includes an intake roller that takes in the document on the document set tray, and
   the intake roller is rotatably held by the second housing and is arranged above the document set tray.

6. The document feeding device according to claim 1, wherein
   the document conveyance mechanism includes an intake roller that takes in the document on the document set tray, and
   the intake roller is rotatably held by the second housing and is arranged to contact the document set tray.

7. An image forming apparatus comprising the document feeding device according to claim 1.

* * * * *